(12) United States Patent
Shin

(10) Patent No.: US 8,110,935 B2
(45) Date of Patent: Feb. 7, 2012

(54) APPARATUS FOR CONVERTING WAVE ENERGY INTO ELECTRICAL ENERGY

(76) Inventor: Icksoo Shin, Theodore, AL (US)

( * ) Notice: Subject to any disclaimer, the term of this patent is extended or adjusted under 35 U.S.C. 154(b) by 425 days.

(21) Appl. No.: 12/497,661

(22) Filed: Jul. 4, 2009

(65) Prior Publication Data

US 2010/0084868 A1    Apr. 8, 2010

(30) Foreign Application Priority Data

Oct. 8, 2008  (KR) .................. 10-2008-0098562

(51) Int. Cl.
- *F03B 13/10*  (2006.01)
- *F03B 13/12*  (2006.01)
- *H02P 9/04*  (2006.01)

(52) U.S. Cl. ........................................ 290/42; 290/53

(58) Field of Classification Search ............... 290/42, 290/43, 53, 54; 60/495, 496, 497, 498, 500, 60/501, 502, 503, 504, 505; 417/330, 332, 417/333, 331

See application file for complete search history.

(56) References Cited

U.S. PATENT DOCUMENTS

| | | |
|---|---|---|
| 4,208,877 A | 6/1980 | Evans |
| 4,228,360 A | 10/1980 | Navarro |
| 4,242,593 A | 12/1980 | Quilico |
| 4,438,343 A | 3/1984 | Marken |
| 4,539,484 A | 9/1985 | Suggs |
| 4,851,704 A | 7/1989 | Rubi |
| 4,954,052 A * | 9/1990 | Simmons .................. 417/331 |
| 5,066,867 A | 11/1991 | Shim |
| 5,176,552 A | 1/1993 | Kuboyama |
| 5,359,229 A | 10/1994 | Youngblood |
| 5,411,377 A | 5/1995 | Houser |
| 5,424,582 A | 6/1995 | Trepl |
| 5,929,531 A | 7/1999 | Lagno |
| 6,695,536 B2 | 2/2004 | Sanchez Gomez |
| 7,045,912 B2 | 5/2006 | Leijon |
| 7,141,888 B2 | 11/2006 | Sabol |
| 7,298,054 B2 | 11/2007 | Hirsch |
| 7,319,278 B2 | 1/2008 | Gehring |
| 7,525,214 B2 * | 4/2009 | Medina et al. ................. 290/53 |
| 7,791,213 B2 * | 9/2010 | Patterson ....................... 290/53 |
| 8,046,108 B2 * | 10/2011 | Hench ........................ 700/286 |
| 2008/0053084 A1 | 3/2008 | Stansby |
| 2008/0054640 A1 * | 3/2008 | Olson ........................... 290/42 |
| 2009/0165454 A1 * | 7/2009 | Weinberg ...................... 60/497 |
| 2010/0032950 A1 * | 2/2010 | Akervoll ....................... 290/53 |
| 2010/0102563 A1 * | 4/2010 | Akervoll ....................... 290/53 |

OTHER PUBLICATIONS

Youngtech Seo of Seo Young Tech. Co., Ltd 'Model-SYG-B245-1kW-400 AFPMG for HAWT catalog, low rpm generator for Small wind turbine' before Oct. 8, 2008, p. 1 at ( http://www.evsmotor.co.kr/kor/product/SYG-B245-1kW-400.pdf ).

* cited by examiner

*Primary Examiner* — Julio Gonzalez

(57) ABSTRACT

An apparatus for converting wave energy into electrical energy includes a wave power generation unit including a frame and float guides. A wave power generation float is joined to the float guides for vertical motion in response to the wave energy. The wave power generation float includes at least one wave power conversion module. The wave power conversion module includes a module case and an air sealing tube formed in the module case for generally preventing fluids from entering the module case. A power transmission cable transmits electrical energy where one end of the power transmission cable passes through the air sealing tube and is joined to the frame. A cable reel winds and unwinds the power transmission cable. A power transmission drive translates a bidirectional rotation of an input shaft into a unidirectional rotation. A generator generates electrical energy in response to the unidirectional rotation.

20 Claims, 11 Drawing Sheets

APPARATUS FOR CONVERTING WAVE ENERGY INTO ELECTRICAL ENERGY

CROSS-REFERENCE TO RELATED APPLICATIONS

The present Utility patent application claims priority benefit under 35 U.S.C. 119(a) of the South Korea patent application No. 10-2008-0098562 filed on 8 Oct. 2008. The contents of this related patent application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to capturing waves and converting them into energy. More particularly, the invention relates to an apparatus for converting wave motion energy into useful electrical energy.

BACKGROUND OF THE INVENTION

In order to reduce the dependence on foreign oil, various types of wave power generation apparatuses have been proposed to harness wave energy. However, these apparatuses have been economically unsuccessful. Wave power produces low-speed, high forces, and the motion of these forces is not in a single direction. However, most readily available electric generators operate at a higher rate of rotations per minute (RPM). Furthermore, a successful wave power generation apparatus must be able to operate reliably in a harsh environment such as in corrosive saltwater and under less than optimal conditions for example in storms, under constant wave action, etc. It is therefore an objective of the present invention to provide an apparatus based on a power converting method of changing reciprocating motion from wave energy into rotational motion for rotating a rotor of a rotary generator. An exemplary method for achieving this in the present invention functions similarly to a conventional pull starter or a retractable measuring tape. Examples of prior art wave power generation apparatuses related to the present invention are disclosed below.

Some known apparatuses use a cable that serves as both a power transmitting cable for a reel and a mooring cable for mooring a float that primarily captures ocean wave energy. However, a returning spring for rewinding the cable may be damaged when excessive external forces by big wave is exerted thereon. When deploying this type of apparatus, large ocean space is required to prevent the cable from being tangled, leading to an increase in the deployment cost over a period of time.

Known apparatuses use various different methods for converting wave energy and storing the converted energy. Some known apparatuses use only one rotational direction for converting wave energy and a flywheel for storing rotational energy. Other known apparatuses use both rotational directions without a flywheel, and yet other apparatuses use both rotational directions and a flywheel, which is the most efficient method due to the maximization of the total input energy to the generator. However, in these advanced apparatuses, the volume and weight of the apparatuses and the number of parts are increased.

Some known apparatuses use a compact generator assembly. However, since these apparatuses only use either the roll or pitch motion of wave energy, power output is less than a conventional coal or oil powered power plant.

Some known apparatuses use a float that includes a linear generator. However, the moment of inertia is not converted into electrical energy in these apparatuses and only one linear generator can be disposed on one axle that guides the movement of the float.

In wave power generation apparatuses, conventional sealing for rotating parts requires continuous maintenance, which increases operating cost over a given period of time. Other apparatuses use a rigid structure for guiding the movement of a float; however, the rigid characteristics of the structure increases stress on the structure due to the continuous ocean wave motion.

In view of the foregoing, there is a need for improved techniques for providing a wave power generation apparatus for harnessing wave energy that is able to survive storm damage and saltwater corrosion, and can be readily maintained, replaced, deployed, operated, endured and economically manufactured while keeping its high level of efficiency. There is an urgent need for a wave power generation apparatus that satisfies those criteria, and can generate reliable useful energy from wave energy.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
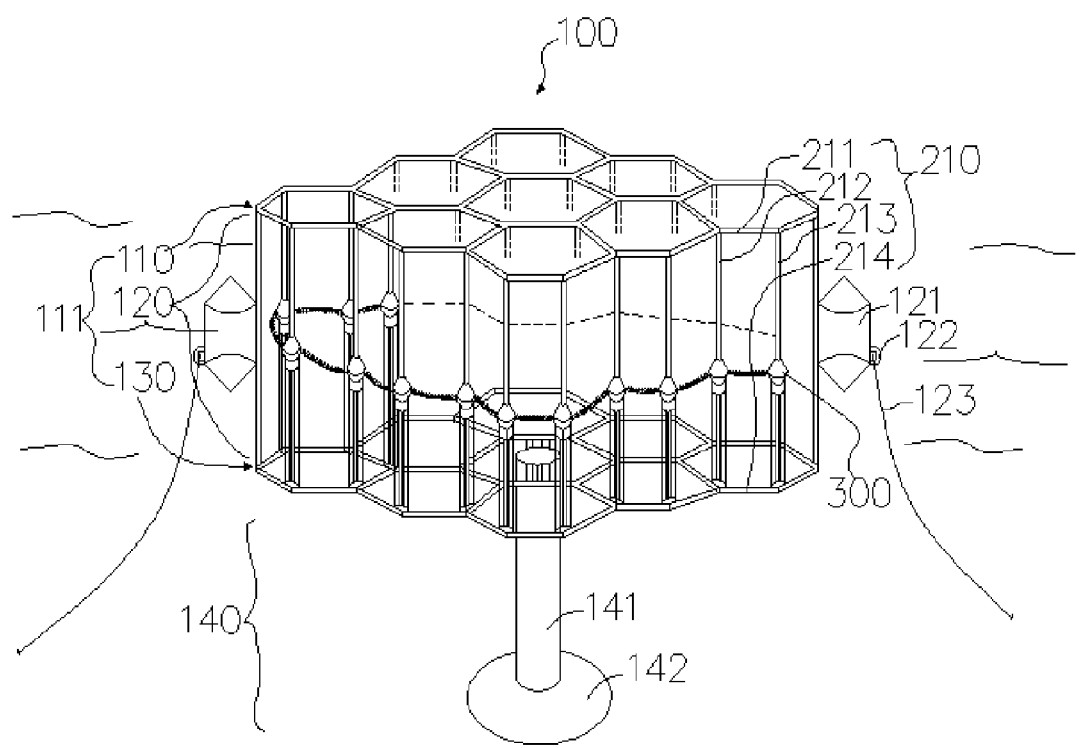
FIG. 1 is a diagrammatic side perspective view of an exemplary wave power generation apparatus, in accordance with an embodiment of the present invention.

Unless otherwise indicated illustrations in the figures are not necessarily drawn to scale.

SUMMARY OF THE INVENTION

To achieve the forgoing and other objects, and in accordance with the purpose of the invention, an apparatus for converting wave energy into electrical energy is presented.

In one embodiment, an apparatus for converting wave energy into electrical energy is presented. The apparatus includes a wave power conversion module including a module case. An air sealing tube is formed in the module case for generally preventing fluids from entering the module case by compression of air in the module case. The air sealing tube extends downward from an interior of the module case through a bottom of the module case. A power transmission cable transmits electrical energy where one end of the power transmission cable passes through the air sealing tube. A cable reel rotatably supported within the module case winds and unwinds a portion of the power transmission cable in response to vertical motion. An elastic force means is joined to the cable reel for storing elastic force during the cable reel rotating to unwind the portion of the power transmission cable and for releasing the stored elastic force to enable the cable reel to wind the portion of the power transmission cable. An input shaft is joined to the cable reel and the elastic force means. A power transmission drive is joined to the input shaft for translating a bidirectional rotation of the input shaft into a unidirectional rotation. An output shaft is joined to the power transmission drive for transferring the unidirectional rotation. A generator is joined to the output shaft for generating electrical energy in response to the unidirectional rotation of the output shaft, and for transferring the electrical energy to the power transmission cable.

In another embodiment, an apparatus for converting wave energy into electrical energy is presented. The apparatus includes at least one wave power generation unit including an upper frame, a lower frame, means for joining the upper frame and the lower frame and means joined to the joining means for vertical motion in response to the wave energy. The vertical motion means includes an upper float covering, a lower float covering sealed to the upper float covering, means for guiding a cable from an interior of the vertical motion means downward through the lower float and means for power conversion contained within the vertical motion means. The power conversion means includes a module case, means for generally preventing fluids from entering the module case by compression of air in the module case. The preventing means extends downward from an interior of the module case through a bottom of the module case. The power conversion means further includes means for transmitting electrical energy through the preventing means and the guiding means, means for winding and unwinding a portion of the transmitting means in response to the vertical motion and means for storing elastic force during the means for winding and unwinding rotating to unwind for releasing the stored elastic force to enable the means for winding and unwinding rotating to wind. An input shaft is joined to the means for winding and unwinding and the storing means. The power conversion means further includes means for translating a bidirectional rotation of the input shaft into a unidirectional rotation, means for transferring the unidirectional rotation and means for generating electrical energy in response to the unidirectional rotation, and for transferring the electrical energy to the transmitting means.

In another embodiment, an apparatus for converting wave energy into electrical energy is presented. The apparatus includes at least one wave power generation unit including an upper frame, a lower frame and a plurality of float guides for joining the upper frame and the lower frame. At least one wave power generation float is joined to the float guides for vertical motion in response to the wave energy. The wave power generation float includes an upper float covering and a lower float covering sealed to the upper float covering. At least one cable guiding tube extends from an interior of the wave power float downward through the lower float and at least one wave power conversion module is contained within the wave power generation float. The wave power conversion module includes a module case and an air sealing tube formed in the module case for generally preventing fluids from entering the module case by compression of air in the module case. The air sealing tube extends downward from an interior of the module case through a bottom of the module case. A power transmission cable transmits electrical energy where one end of the power transmission cable passes through the air sealing tube and the cable guiding tube, and is joined to the lower frame. A cable reel is rotatably supported within the module case for winding and unwinding a portion of the power transmission cable in response to the vertical motion of the wave power generation float. An elastic force means is joined to the cable reel for storing elastic force during the cable reel rotating to unwind the portion of the power transmission cable and for releasing the stored elastic force to enable the cable reel to wind the portion of the power transmission cable. An input shaft is joined to the cable reel and the elastic force means. A power transmission drive is joined to the input shaft for translating a bidirectional rotation of the input shaft into a unidirectional rotation. An output shaft joined to the power transmission drive for transferring the unidirectional rotation. A generator is joined to the output shaft for generating electrical energy in response to the unidirectional rotation of the output shaft, and for transferring the electrical energy to the power transmission cable. In another embodiment, the top portion of the air sealing tube includes a funnel shape for draining fluid from the interior. In yet another embodiment, the power transmission drive further includes a first input gear and a second input gear joined to the input shaft. A first side one way bearing and a second side one way bearing are oriented to be locked in opposite rotation directions and interposed between the first input gear, the second input gear and the input shaft. An output gear is joined to the output shaft and engaged with the first input gear and the second input gear. The output gear has a smaller diameter than that of the first input gear and the second input gear for increasing rotational speed. An output side one way bearing is interposed between the output gear and the output shaft, and oriented to be locked with the output shaft for the output shaft to be rotated in a same direction as the output gear rotates. In still another embodiment, the output gear, the output shaft and the generator form a generator assembly for enabling ease of removal. In another embodiment, the power transmission drive further includes an input gear joined to the input shaft. A first output gear and a second output gear are joined to the output shaft and engaged with the input gear. The first output gear and the second output gear have a smaller diameter than that of the input gear for increasing rotational speed. A first one way bearing and a second one way bearing are oriented to be locked in a same rotation direction interposed between the first output gear, the second output gear and the output shaft. In another embodiment, the input shaft and the output shaft are orientated substantially parallel and the power transmission drive further includes an input pulley and an input gear joined to the input shaft. A pulley one way bearing is interposed between the input pulley and the input shaft. A gear one way bearing is interposed between the input gear and the input shaft, where the pulley and the gear one way bearing are reversely oriented to each other. The power transmission drive further includes a belt and an output pulley joined to the output shaft and engaged with the input pulley through the belt. An output gear is joined to the output shaft and engaged with the input gear, wherein diameters of the input pulley and the input gear are relatively greater than that of the output pulley and the output gear for increasing rotational speed. Yet another embodiment further includes a flywheel joined to the output shaft for storing inertial energy. In still another embodiment, the upper float covering includes a conical shape for enabling a wind to produce a downward force and the lower float covering includes a conical shape for converting horizontal motion of wave energy into vertical motion. In another embodiment, the wave power generation float further includes a buoyancy increasing means for adjustably increasing buoyancy and a float tube for joining to a float guide. Yet another embodiment further includes a plurality of wave power generation floats joined to float guides and a plurality of elastic connecting bodies joining the plurality of wave power generation floats for restricting rotation of the plurality of wave power generation floats. Still another embodiment further includes a first guiding member slidably joined to a first float guide. A second guiding member is slidably joined to a second float guide. A first elastic connecting body is joined to the first guiding member and the wave power generation float. A second elastic connecting body is joined to the second guiding member and the wave power generation float, wherein the wave power generation float is joined to the first float guide and the second float guide for vertical motion in response to the wave energy. Another embodiment further includes a first wave power generation float slidably joined to a first float guide. A second wave power generation float is slidably joined to a second float guide. A third wave power generation float is included. A first elastic connecting body is joined to the first wave power generation float and the third wave power generation float. A second elastic connecting body is joined to the second wave power generation float and the third wave power generation float, wherein the first wave power generation float, second wave power generation float and third wave power generation float are joined to the first float guide and the second float guide for vertical motion in response to the wave energy. Yet another embodiment further includes at least one module fixing body joined to the upper frame and including at least one wave power conversion module where the power transmission cable of the at least one wave power conversion module is joined to the wave power generation float, wherein vertical motion of the wave power generation float in response to the wave energy enables the at least one wave power conversion module of the module fixing body to generate electrical energy. Still another embodiment further includes a shake reducing means joined to bottom of the apparatus for lowering a center of gravity of the apparatus. A buoyant tank is joined to the apparatus for increasing buoyancy of the apparatus, and a mooring cable joined to the buoyant tank for mooring the apparatus. In another embodiment, the apparatus is configurable for joining with a vessel. In yet another embodiment, the apparatus is configurable for joining with a seabed. In still another embodiment, the apparatus further includes a plurality of wave power generation units configured in a honeycomb arrangement.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present invention provide a wave power generation apparatus to maximize output power by using a compact wave power conversion module using both rotational directions as input power, a flywheel for storing rotational energy and overdrive gear mechanisms that change high force into high RPM. In preferred embodiments, the wave power generation apparatus is readily maintainable due to modularity of the wave power conversion modules, which are readily interchangeable and may be grouped together. Preferred embodiments of the present invention may be deployed in-shore, on-shore or offshore.

Figure 2:
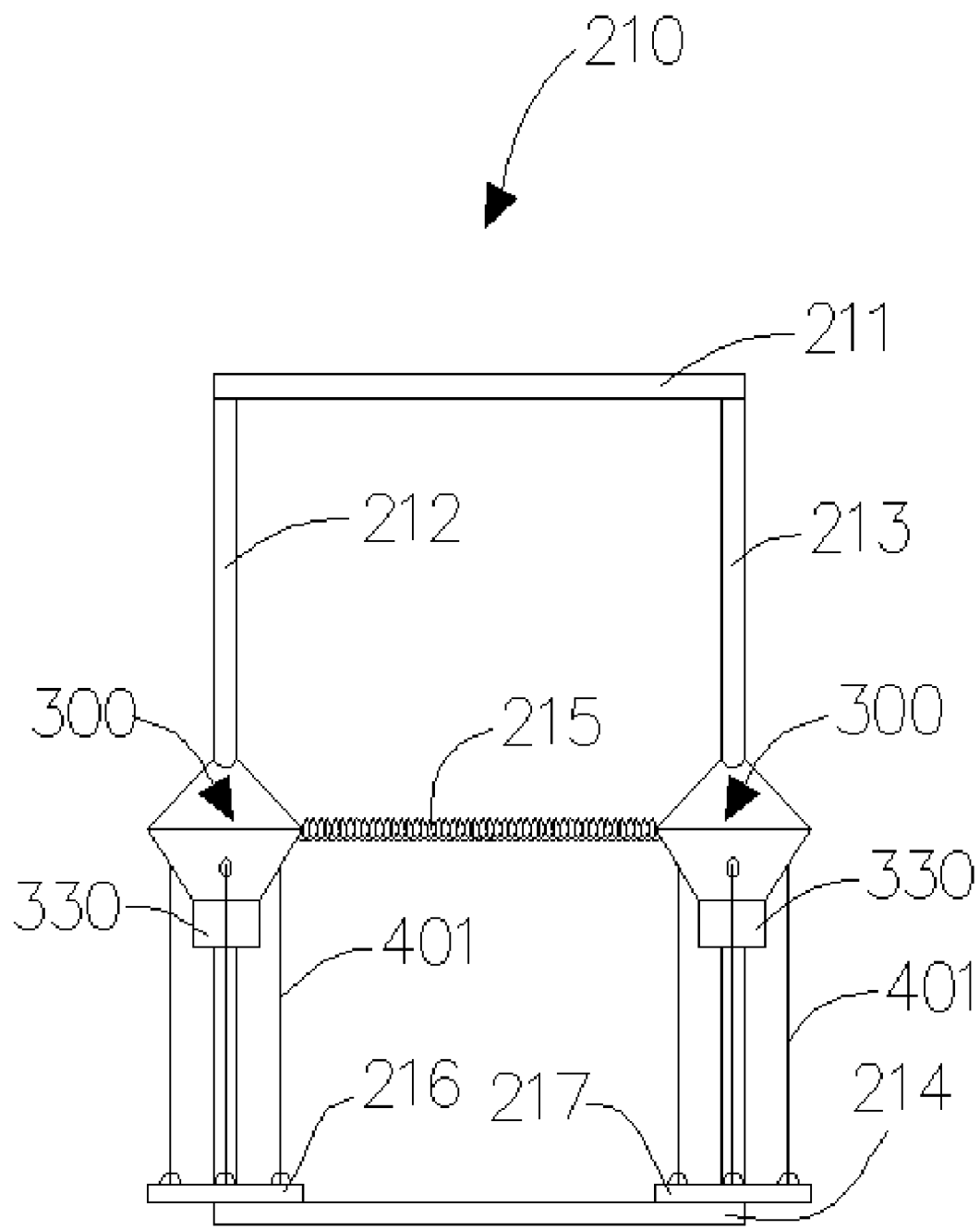
FIG. 2 is a diagrammatic side view of an exemplary wave power generation unit, in accordance with an embodiment of the present invention.
Figure 3:
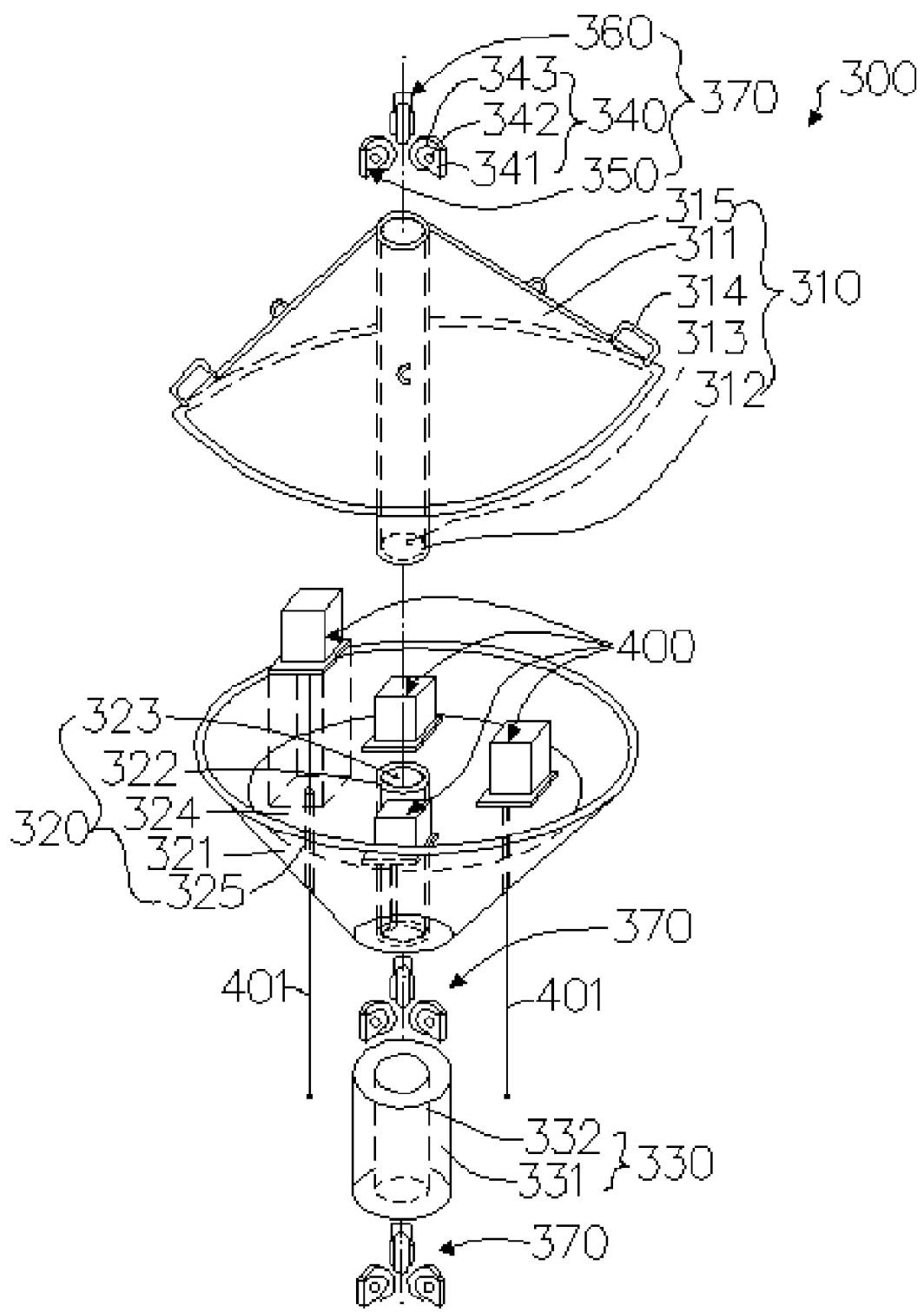
FIG. 3 is a diagrammatic side perspective view of an exemplary wave power generation float, in accordance with an embodiment of the present invention.
Figure 4:
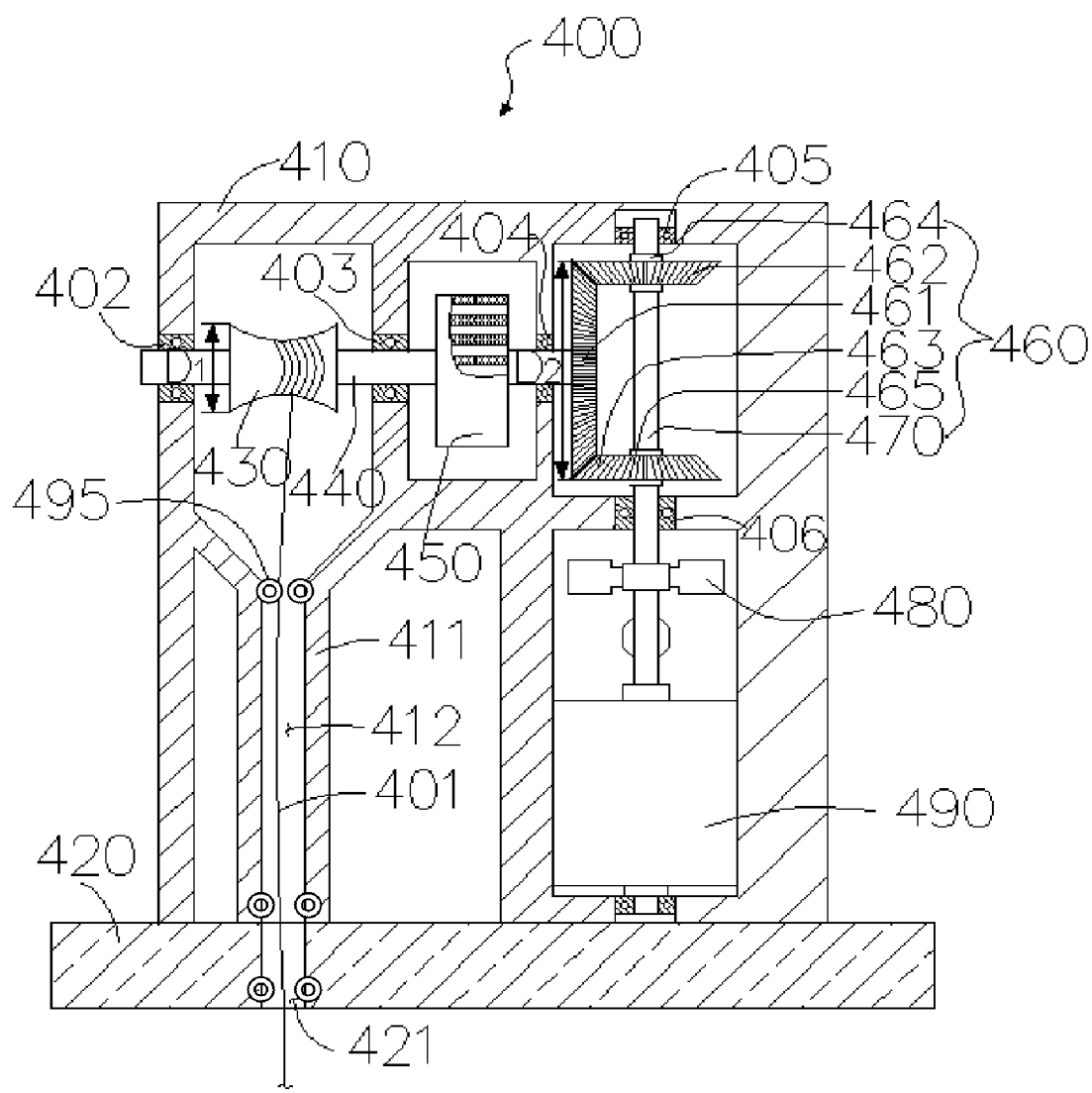
FIG. 4 is a cross sectional view of an exemplary wave power conversion module, in accordance with an embodiment of the present invention.

Referring initially to FIGS. 1-4, an exemplary apparatus for generating electrical power in accordance with an embodiment of the present invention is illustrated. FIG. 1 is a diagrammatic side perspective view of an exemplary wave power generation apparatus 100, in accordance with an embodiment of the present invention. FIG. 2 is a diagrammatic side view of an exemplary wave power generation unit 210, in accordance with an embodiment of the present invention. FIG. 3 is a diagrammatic side perspective view of an exemplary wave power generation float 300, in accordance with an embodiment of the present invention; and FIG. 4 is a cross sectional view of an exemplary wave power conversion module 400, in accordance with an embodiment of the present invention.

In the present embodiment, wave power generation apparatus 100 comprises a wave power generation structure 111 which comprises an upper frame part 110, a power generation part 120 and a lower frame part 130, buoyant tanks 121, mooring cables 123, and shake reducing means 140 which comprises a shake reducing member 142 and a shake reducing means connector 141. Wave power generation unit 210 comprises an upper frame 211 of upper frame part 110, a first float guide 212 and a second float guide 213 of power generation part 120, a lower frame 214 of lower frame part 130, elastic connecting means 215 and wave power generation float 300. Said wave power generation float 300 in accordance with the present embodiment comprises an upper float 310, a lower float 320, buoyancy increasing means 330, and wave power conversion modules 400. Said wave power conversion modules 400 in accordance with the present embodiment each comprise a module case 410, a module base 420, a power transmitting cable 401, a reel 430, an input shaft 440, an elastic force providing means 450, a power transmission drive 460, an output shaft 470, a flywheel 480 and a generator 490.

At large, now referring to FIG. 2, wave power generation unit 210 can be formed such that upper frame 211 and lower frame 214 are connected by first float guide 212 and second float guide 213, which are spaced apart in parallel to each other. Float guides 212 and 213 are preferably made of a rigid material such as, but not limited to, steel, plastic, carbon fiber or fiberglass. In an alternative embodiment, some of the rigid float guides may be replaced in upper frame 211 with non-rigid float guides made of an elastic material such as, but not limited to, springs, flexible cable, rope, etc. for absorbing shock on wave power generation floats 300 in rough waves and for lowering manufacturing cost.

In the present embodiment, wave power generation floats 300 are movably disposed on first float guide 212 and second float guide 213. Thus wave power generation floats 300 can freely slide up and down along float guides 212 and 213 by the kinetic energy of waves. The moving range of wave power generation floats 300 is between the upper end and lower end of float guides 212 and 213. Generator 490 of wave power conversion module 400, which converts kinetic energy of waves into electrical energy and is shown by way of example in FIG. 4, is disposed inside reciprocating wave power generation float 300.

In order to generate electricity as described above, the wound length of power transmitting cable 401 around reel 430 in power conversion module 400 is varied by the motion of the waves. The end portion of power transmitting cable 401 opposite reel 430 is connected to cable fixing means 216 and 217 for fixing cable 401 on the upper side of lower frame 214.

The wave power generation float 300 disposed on first float guide 212 is connected to another wave power generation float 300 disposed in second float guide 213 through elastic connecting means 215 for preventing the floats 300 from rotating. Elastic connecting means 215 is preferably made of an elastic material such as, but not limited to, a spring, rubber, flexible cable, etc. Thus, the loss of power from the tangling or twisting of power transmitting cable 401 caused by the rotation of wave power generation float 300 can be generally prevented.

Now referring to FIG. 1, wave power generation structure 111 of wave power generation apparatus 100 is constructed by interconnecting a plurality of wave power generation units 210 with one another and forming a honeycomb shape. Namely, wave power generation structure 111 for electricity generation is formed by overlapping wave power generation units 210 so they share float guides 212 and 213 and wave power generation floats 300 among a plurality of said wave power generation units. Wave power generation units 210 are connected to one another by fastening means such as, but not limited to, welding, bolting, clamping, adhesives, etc.

As an example for the shape of wave power generation structure 111, a honeycomb shape is preferably presented in the present embodiment. A plurality of wave power generation units 210 can be interconnected to form the honeycomb shaped structure. A plurality of the honeycomb shaped structures forms a greater wave power generation structure 111 by being interconnected with one another. In alternate embodiments, the shape of the wave power generation structure may vary; for example without limitation, upper 110 and lower 130 frame part, shown by way of example in FIG. 1, of wave power generation structures in alternate embodiments may have a plurality of polygonal shapes such as, but not limited to, trigonal or tetragonal shape etc. instead of hexagonal shape of the honeycomb.

However wave power generation structure 111 is formed as a honeycomb shape in the present embodiment because the characteristics of the honeycomb shape enhance the durability of wave power generation apparatus 100. Since wave power generation structure 111 can be easily enlarged by adding additional wave power generation units 210, the size of wave power generation apparatus 100 can be flexibly constructed depending on power demand.

For explanation purposes, wave power generation structure 111, an aggregate of a plurality of wave power generation units 210, can be vertically divided into three main parts that are upper frame part 110, power generation part 120, and lower frame part 130. Upper frame part 110 and lower frame part 130 are connected by float guides 212 and 213 of power generation parts 120.

In the present embodiment, buoyant tanks 121 are placed on the perimeter of power generation structure 111 and are connected in approximately the middle of float guides 212 and 213 of power generation part 120. Buoyant tanks 121 are sealed inside and provide buoyant force to wave power generation apparatus 100 so that wave power generation apparatus 100 can float. A plurality of buoyant tanks 121 is preferably disposed along the perimeter of power generation structure 111 in a symmetric manner to maintain its balance. Referring to FIG. 1, two buoyant tanks 121 are shown; however, more buoyant tanks may be used. A mooring connecting means 122 for fastening mooring cable 123 to buoyant tank 121 is formed in the lower part of buoyant tank 121. Said mooring connecting means 122 may have a collar or ring shape or another shape such as, but not limited to, a U-shape, rectangular shape, semi-circular shape, etc. Mooring cable 123 for mooring wave power generation apparatus 100 is connected to mooring connecting means 122, and the other end of mooring cable 123 is connected to an anchor, the seabed or the like.

Shake reducing member 142, which is located under the water surface, lowers the center of gravity of wave power generation apparatus 100 to generally prevent apparatus 100 from excessive shaking. Shake reducing member 142 functions similarly to a keel of a yacht or ballast, reducing excessive shaking of wave power generation apparatus 100 that may be caused by a storm or swells. Shake reducing member 142 is connected to the lower end of shake reducing means connector 141, which is connected to the underside of lower frame part 130.

In typical operation of the present embodiment, lower frame 130 and the lower portion of buoyant tanks 121 are submerged. Upper frame 110 and the upper part of power generation parts 120 are disposed above the water's surface. Electricity is generated by a plurality of wave power generation floats 300 slidably disposed on float guides 212 and 213 of power generation parts 120.

Now referring to FIG. 3, wave power generation float 300 comprises upside down, conical shaped lower float 320 and conical shaped upper float 310, which covers said lower float 320. Wave power generation float 300 is sealed against fluids such as, but not limited to, saltwater and rainwater. Wave power generation float 300 comprises a float tube that extends from the lower vertex of a lower float body 321 of lower float 320 to the upper vertex of an upper float body 311 of upper float 310. Said float tube is comprised of an upper float tube 312 and a lower float tube 322. An upper penetrated hole 313 and a lower penetrated hole 323, which is connected to upper penetrated hole 313, are formed inside of upper float tube 312 and lower float tube 322, respectively. Float guides 212 and 213, shown by way of example in FIG. 2, can be inserted into said float tube so that wave power generation float 300 is slidably disposed along float guides 212 and 213.

A connecting collar 314 of upper float 310 connects elastic connecting means 215, shown by way of example in FIG. 2 to wave power generation float 300. In the present embodiment, upper float 310 comprises multiple connecting collars 314 to enable multiple elastic connecting means 215 to be connected to upper float 310. Cable-fastening collars 315 are formed approximately in the middle of the outside upper float body 311 of upper float 310. If additional wave power conversion modules 400 are disposed outside of wave power generation float 300, cable fastening collars 315 fasten power transmitting cables 401 of the additional wave power conversion modules 400 disposed outside of wave power generation float 300. Such cable fastening collars 315 are useful to a wave power generation unit 240 shown by way of example in FIG. 7, which is discussed below in detail. In the present embodiment cable fastening collars 315 are presented for the fastening of power transmitting cable 401 on the outside of upper float 310. However, in alternate embodiments alternate fastening methods such as, but not limited to, bolting, tying, gluing, etc. may be used instead of collar 315. In the present embodiment, a float base 324 is a plate that is mounted near the top of the inside of lower float 320 so that wave power conversion modules 400 can be mounted upon said float base 324. Cable guiding tubes 325 extend from float base 324 where air-sealing tubes 411 of wave power conversion modules 400, shown by way of example in FIG. 4, are positioned to reach the exterior of lower float 320. Thus, power-transmitting cables 401 extending from wave power conversion modules 400 mounted on float base 324 pass through cable guiding tubes 325.

Buoyancy increasing means 330 is comprised of a plastic sealed buoyant body 331 and a buoyancy increasing means tube 332 that penetrates the center of buoyant body 331. Buoyancy increasing means 330 increases buoyancy of wave power generation float 300, aiding wave power generation float 300 in moving smoothly up and down along float guides 212 and 213, which pass through upper float tube 312 and lower float tube 322 and buoyancy increasing means tube 332. The buoyant force of buoyancy increasing means 330 can be controlled by using a larger buoyancy increasing means that has more buoyancy or by injecting compressed gas or air therein. Then, the level of floatation can be controlled to maintain a preferred level of floatation. In the present embodiment the preferred level of flotation is such that the junction of lower float 320 and buoyancy increasing means 330 is approximately positioned at about the surface of the water for securing sealing by air sealing tube 411, shown by way of example in FIG. 4, to protect steel made parts inside of the wave power conversion module 400

In the present embodiment, roller units 370 are installed on the inner wall of upper float tube 312, lower float tube 322 and buoyancy increasing means tube 332.

Said roller unit 370 is preferably comprised of a first 340 roller, a second 350 roller and a third roller 360. Each roller has the same form. As an example, first roller 340 is comprised of a wheel 343, a rotational shaft 342 for said wheel 343 and supporting means 341 for rotational shaft 342. Rotational shaft 342 is fixed inside the wall of upper float tube 312, lower float tube 322 and buoyancy increasing means tube 332 so that wheel 343 can be smoothly rotated. Rollers 340, 350 and 360 are installed in a triangular configuration. Then, each wheel of roller unit 370 can reduce friction between float guide 212 or 213 and wave power generation float 300 when float 300 slides along float guide 212 or 213. Similar roller units may be installed in air sealing tubes 411, shown by way of example in FIG. 4. Alternate embodiments may be implemented without roller units. However, these embodiments may incorporate various different means for reducing the friction between the float and the float guide such as, but not limited to, bearings, lubrication, etc.

In the present embodiment, upper float 310 has a conical shape. Strong wind generates downward force on the conical shaped upper float 310 which means the shape enables wave power generation float 300 to be more submerged. Thus, excessive motion speed and range of wave power generation float 300 that may cause overheating of generator 490, shown by way of example in FIG. 4 are decreased. Therefore, damage to wave power generation float 300 of wave power generation apparatus 100 caused by a storm or the like can be minimized. Lower float 320 is formed in an upside down conical shape. This shape functions similarly to a bow of a ship, enabling lower float 320 to ride over incoming waves. The shape also enables wave power generation float 300 to utilize various types of waves, especially breaking waves as input kinetic energy. Since even horizontal force of incoming waves such as, but not limited to, breaking waves can be utilized due to the upside down conical shape of lower float 320, the input kinetic energy from waves is increased. Therefore, the efficiency of electricity generation of apparatus 100 is increased. Those skilled in the art, in light of the present teachings, will readily recognize that floats in alternate embodiments may be made in various different shapes such as but not limited to, egg shapes, pyramids, spheres, etc.

In addition, since wave power conversion modules 400, which generate electricity, are disposed inside of wave power generation float 300 and are positioned above the water's surface, negative effects due to saltwater such as, but not limited to, corrosion of parts in wave power conversion module 400 are minimized. Thus sealing means for preventing corrosion is simplified. The use of conventional sealing means which requires continuous maintenance is avoided in the present embodiment, thus operation cost is decreased.

When wave power generation float 300 is installed in a place that has abundant wave resources such as, but not limited to, high wave height, the size of wave power generation float 300 can be increased. Thus the installed number of wave power conversion modules 400 inside wave power generation float 300 can be increased as well. Therefore, modification for increasing the capacity of the electricity generation of apparatus 100 is easily performed due to the modularity of wave power conversion module 400. If the volume of wave power generation float 300 is increased and if the installed number of wave power conversion modules 400 is increased, the submerged portion of wave power generation float 300 is also increased. The submerged portion can be controlled by injecting compressed gas or air in buoyancy increasing means 330 or by connecting a bigger buoyancy increasing means 330 that gives more buoyant force to wave power generation float 300.

In typical use of the present embodiment, wave power generation float 300 comprising wave power conversion modules 400 therein moves along float guides 212 or 213. Wave power generation apparatus 100, which is comprised of a plurality of wave power generation floats 300 is moored by mooring cables 123 that are separated from power transmitting cables 401, therefore, the damage of an elastic force providing means of prior art such as, but not limited to, a spiral spring due to excessive external force by rough waves can be prevented and a relatively broader range of wave energy can be converted into electrical energy.

Generally, in the case of the prior art where a linear generator is being used, one linear generator is installed on one float guide. Since more than one generator can be installed inside wave power generation float 300 in the present embodiment which is movably disposed on float guide 212 or 213, a plurality of generators 490 can be installed on one float guide. Therefore, even if the prior art apparatus is the same size as wave power generation apparatus 100, the amount of generated electricity of the present embodiment is greater than that of the linear type apparatus known in the prior art.

Now referring to FIG. 4, in the present embodiment, wave power conversion module 400 comprises module base 420 and module case 410, which covers module base 420. Reel 430 is disposed in the upper space of module case 410. Reel 430 is connected to input shaft 440, which is rotatably supported by bearings 402, 403 and 404 installed in module case 410. The lower end of power transmitting cable 401, which is wound around reel 430, extends downwardly. Air sealing tube 411 formed under reel 430 is perpendicularly connected to module base 420. Air sealing tube 411 is a tube that generally prevents fluid such as, but not limited to, saltwater, freshwater and rainwater etc. from entering the inside of module case 410 with the use of compressed air. Power transmitting cable 401 extending from reel 430 can be passed through a penetrating hole 412, which is formed inside air sealing tube 411. A base side cable hole 421 of module base 420 is connected to the lower end of air sealing tube 411. Thus power transmitting cable 401 can be extended outside of wave power conversion module 400 through air sealing tube 411 and base side cable hole 421. A power transmitting cable 401 that is extended outside of module 400 passes through cable guiding tube 325, shown by way of example in FIG. 3, and is connected to cable fixing means 217, shown by way of example in FIG. 2.

The reel side diameter of air sealing tube 411 is relatively greater than that of the other end. Air sealing tube 411 can be formed as funnel-like shape in order to effectively remove the fluid such as, but not limited to, saltwater, freshwater and rainwater etc. of reel 430 moved by power transmitting cable 401 by using gravity through said sealing tube 411.

The funnel shape of air sealing tube 411 is efficient for draining fluid due to its slope inside. Namely, it is a combination of a thin tube through which power transmitting cable 401 can slide up and down, and an inverted cone shaped body connected to the top end of the thin tube. However, those skilled in the art, in light of the present teachings will readily recognize that a multiplicity of different shapes may be used for the air sealing tube in alternate embodiments such as, but not limited to, a conical shape.

In typical operation of the present embodiment, air in the space in which reel 430 is disposed is compressed by pressure caused by the inflow of saltwater through air sealing tube 411. Thus, since the inflow of saltwater through air sealing tube 411 can be stopped by the pressure of compressed air in air sealing tube 411, sealing of wave power conversion module 400 can be achieved without using a conventional mechanical seal which requires continuous maintenance. Moreover, response time of the rotor in generator 490 can be reduced because the fluid or gas as sealants against saltwater which are used inside the generators in prior art apparatuses and causes longer response time, is avoided.

Therefore, module case 410 is sealed against outside fluids such as, but not limited to, saltwater and rainwater, and air sealing tube 411 connects the inside and outside of module case 410 to guide power transmitting cable 401 in and out of module case 410. In the present embodiment, power transmitting cable 401 is stably guided through guiding rollers 495 in air sealing tube 411, which is similar to roller unit 370, shown by way of example in FIG. 3. Alternate embodiments may be implemented without guiding rollers. In the present embodiment, the lower end of air sealing tube 411 is preferably positioned above the average water level for securing sealing by air sealing tube 411.

Elastic force providing means 450, such as, but not limited to, a spring, rubber or a spiral spring, is disposed in input shaft 440. When cable 401 is unwound, elastic force providing means 450 stores elastic force, and when cable 401 is wound, elastic force providing means 450 releases this elastic force. One end of elastic force providing means 450 is fixed to input shaft 440 and the other end of elastic force providing means 450 is connected to module case 410.

Then, in typical operation of the present embodiment, when wave power conversion module 400 is moved up by wave motion, power transmitting cable 401 wound around reel 430 is unwound by the upward kinetic energy of the wave. Thus, elastic force providing means 450 stores elastic force therein. When wave power conversion module 400 is moved down by wave motion, input shaft 440 can be reversely rotated by stored elastic force from elastic force providing means 450. Thus, power transmitting cable 401 is wound around reel 430 keeping tension on cable 401. Though elastic force providing means 450 is preferably a spiral spring, elastic force providing means 450 may be any material that provides elastic force including, but not limited to, rubber, other types of springs, etc.

Along input shaft 440, power transmission drive 460 is disposed beside elastic force providing means 450. Power transmission drive 460 is comprised of an input gear 461 fixed to input shaft 440 and a first output gear 462 and a second output gear 463 that are disposed on output shaft 470 and perpendicularly engaged on both sides of input gear 461. A first one way bearing 464 is interposed between first output gear 462 and output shaft 470. A second one way bearing 465 is interposed between second output gear 463 and output shaft 470. Input shaft 440 and output shaft 470 are perpendicular to each other. Output shaft 470 is rotatably supported by bearings 405 and 406 installed in module case 410. Output gears 462 and 463 perpendicularly engaged in input gear 461 can be rotated in accordance with the rotation of input shaft 440. First one way bearing 464 and second one way bearing 465 are oriented to be locked with output shaft 470 when one of output gears 462 or 463 is rotated in the same direction.

In typical operation of the present embodiment, when input gear 461 is rotated by kinetic wave energy, first one way bearing 464 is locked with output shaft 470, and second one way bearing 465 idles. Thus, power can be transmitted from input gear 461 to output shaft 470 through first output gear 462. When input gear 461 is rotated in the opposite rotational direction by elastic force providing means 450, second one way bearing 465 is locked with output shaft 470, and first one way bearing 464 idles. Thus, power can be transmitted from input gear 461 to output shaft 470 through second output gear 463. Since both one-way bearings 464 and 465 are oriented to transmit power in the same rotational direction of output gears 462 and 463, output shaft 470 rotates in only one rotational direction regardless of the rotational direction of input gear 461 of input shaft 440. In this way, though the direction of the rotation of input shaft 440 may vary depending on the direction of the wave energy and elastic force providing means 450, output shaft 470 can be continuously rotated in only one direction by power transmission drive 460. Thus electricity can be smoothly generated in generator 490.

Generators 490 are electrically connected to conventional electrical devices (not shown) such as, but not limited to batteries for storing electrical power and inverters, rectifiers and voltage regulators for improving power quality etc. through power transmitting cables 401 that also can serve as a power cord. The conventional electrical devices may be located on the apparatus 100, in the float 300 or in the ship 10 shown by way of example in FIG. 10.

A unique advantage of the present embodiment is that an electrical-system-module (not shown), which may include conventional electrical devices for the present embodiment, can be adapted from that of a small-wind-turbine-systems (not shown) which is already tested and developed due to similarities of power generation factors, such as using of rotary generators rotating in single direction and characteristics of renewable input energy source, which are irregular and unpredictable. By being electrically connected to generators 490, the electrical-system-module of the conventional small-wind-turbine-systems for regulating generated power, improving power quality and storing or distributing power can be utilized with the present embodiment with minor adjustment to the wave environment, therefore the development cost for the present embodiment is decreased.

If the system is in a stand-alone mode, the generator 490 should be connected to battery array. If the system is in a power grid-tied mode, the generator 490 should be connected to an inverter to adjust generated wild voltage and frequency which are varied in its voltage and frequency to standard one such as, but not limited to, 60 Hz and 100V. In the present embodiment, the apparatus 100 may be connected to a conventional power grid (not shown) via a conventional power transmission line (not shown) which may be installed on the seabed for distributing power to the ground.

A flywheel 480 is disposed on output shaft 470 to help steady the rotation of output shaft 470 when fluctuating torque is exerted on output shaft 470 such as, but not limited to, the changing of the rotational direction of reel 430. Thus, output shaft 470 can be continuously rotated in accordance with the rotational direction. According to the rotation of output shaft 470, electricity can be generated in generator 490 coupled to output shaft 470. Alternate embodiments may be implemented without a flywheel.

When the present embodiment is deployed in an environment that has a small wave height difference, an additional overdrive gear train or box (not shown) such as, but not limited to, a planetary gears assembly or the like can be used along output shaft 470 in order to change the high force from wave energy into high RPM of said output shaft 470. The diameter D2 of input gear 461 is relatively greater than the diameter D1 of reel 430 and output gears 462 and 463. Then, since the number of rotations of output shaft 470 is greater than that of input shaft 440, the efficiency of electricity generation of apparatus 100 is improved. Another option that may be used in an alternate embodiment is to select a conventional low RPM generator which starts to generate electrical power at low RPM from a conventional small-wind-turbine-system as the generator of the wave power conversion module instead of using regular generator 490 which requires relatively high RPM Since the compact wave power conversion module 400 of the present embodiment uses both rotational directions and flywheel 480 for storing rotational energy without using complex parts, the efficiency of electricity generation is improved over conventional wave power generating methods. Flywheel 480 also enables generator 490 to use its own moment of inertia to further increase efficiency. Since wave power conversion module 400 is compact and modular, module 400 can be mounted on various types of float shapes without losing its advantages such as, but not limited to, spherical floats, cylindrical floats, egg shaped floats, pyramid shaped floats, etc.

From this point below, alternate embodiments of the present invention are explained. Carrying on the explanation related to alternate embodiments, descriptions and explanations that are already described and overlap from the first embodiment of the present invention described in the foregoing are omitted.

Figure 5:
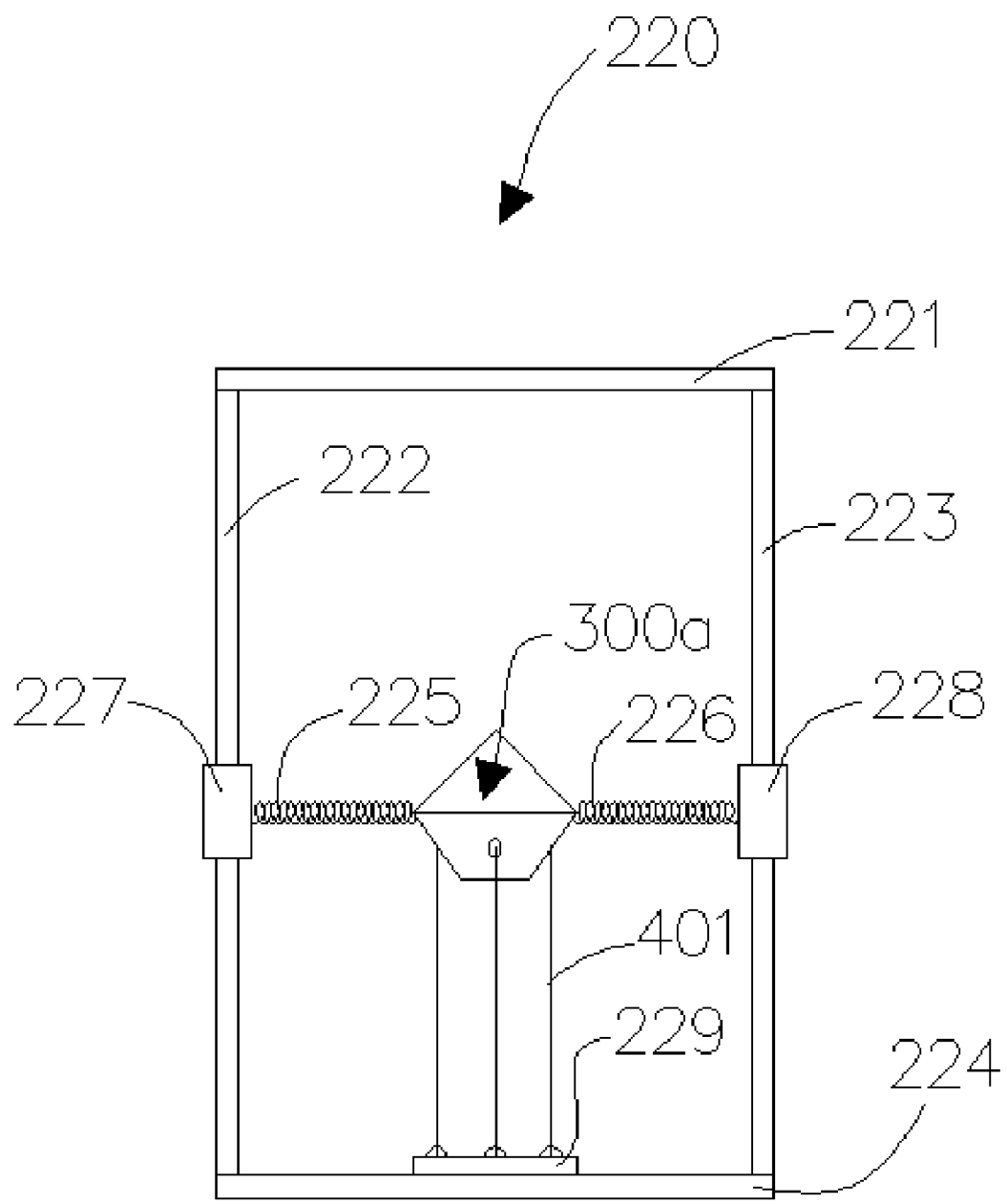
FIG. 5 is a diagrammatic side view of an exemplary non-penetrated type wave power generation unit, in accordance with an embodiment of the present invention.

FIG. 5 is a diagrammatic side view of an exemplary non-penetrated type wave power generation unit 220, in accordance with an embodiment of the present invention. In the present embodiment, a first float guide member 227 and a second float guide member 228 which has a cylindrical shape comprise openings in the center thereof for first float guide 222 and second float guide 223, respectively. Float guide members 227 and 228 are slidably disposed on float guides 222 and 223, which connect upper frame 221 and lower frame 224 to form a rectangular structure for wave power generation unit 220. In the present embodiment, float guide members 227 and 228 comprise roller units similar to roller unit 370, shown by way of example in FIG. 3, on the inside wall of the opening for reducing friction. In alternate embodiments a multiplicity of different means for reducing friction may be used such as, but not limited to, bearings, lubrication, etc.

In the present embodiment, a first elastic connecting means 225 and a second elastic connecting means 226 connected to float guide members 227 and 228, respectively, connect a wave power generation float 300a to float guide members 227 and 228. A plurality of power transmitting cables 401 extended from wave power generation float 300a are fastened to a cable fixing means 229 mounted on lower frame 224 to fix power transmitting cables 401 to the upper side of lower frame 224. Since wave power generation float 300a can float by self-buoyancy and is guided by float guide members 227 and 228 rather than sliding on float guides 222 and 223, wave power generation float 300a may be formed without buoyancy increasing means and without a penetrating tube as in wave power generation float 300, shown by way of example in FIG. 3. The simpler design of this embodiment may enable manufacturing cost to be decreased.

Figure 6:
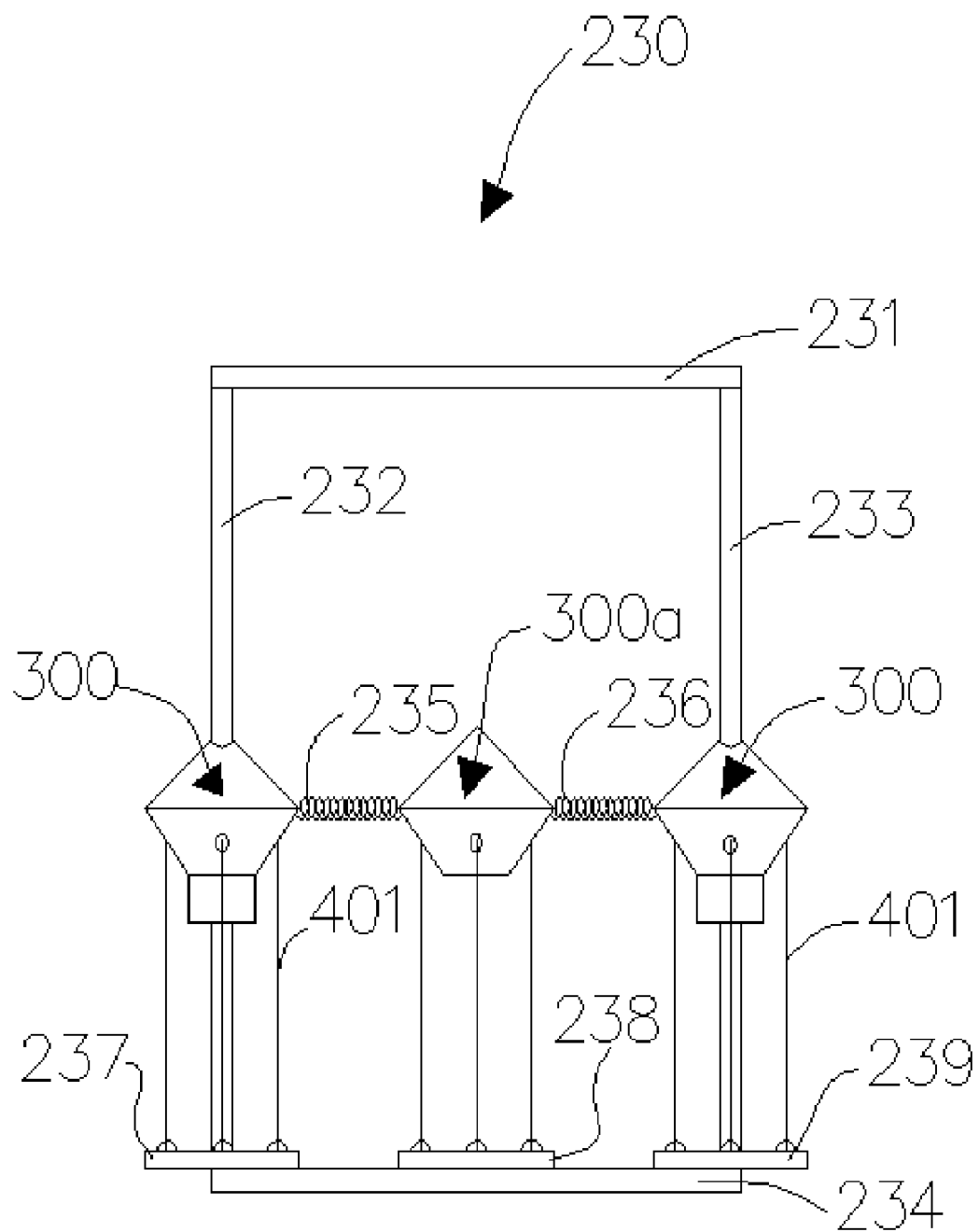
FIG. 6 is a diagrammatic side view of an exemplary hybrid wave power generation unit, in accordance with an embodiment of the present invention.

FIG. 6 is a diagrammatic side view of an exemplary hybrid wave power generation unit 230, in accordance with an embodiment of the present invention. In the present embodiment, first and second wave power generation floats 300 are slidably disposed on a first float guide 232 and a second float guide 233, which connect an upper frame 231 and a lower frame 234. A first elastic connecting means 235 and a second elastic connecting means 236, which are extended from first and second wave power generation floats 300, are connected to an additional wave power generation float 300a.
A plurality of power transmitting cables 401 extended from wave power generation floats 300 and 300a are fastened to a cable fixing means 237, 238 and 239 mounted on lower frame 234 to fix end portions of power transmitting cables 401 to the upper side of lower frame 234.
Like wave power generation float 300a shown by way of example in FIG. 5, wave power generation float 300a in the present embodiment does not need buoyancy increasing means or a penetrating tube. Since an additional wave power generation float is included in the present embodiment, the number of installed wave power conversion modules in wave power generation unit 230 is increased in comparison to wave power generation unit 210 of the preferred embodiment. Therefore, the efficiency of electricity generation of wave power generation unit 230 is improved.

Figure 7:
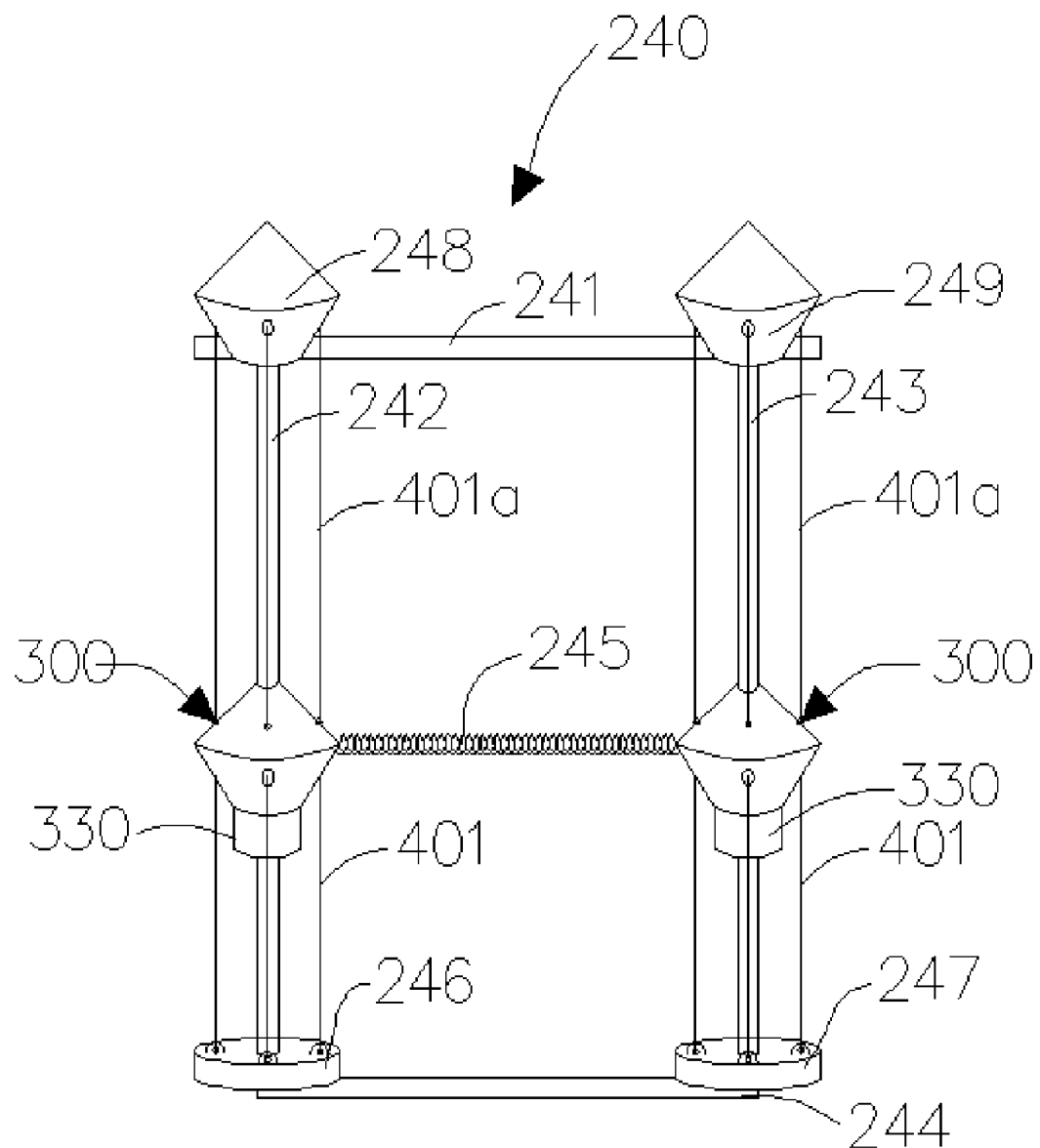
FIG. 7 is a diagrammatic side view of an exemplary double layer wave power generation unit, in accordance with an embodiment of the present invention.

FIG. 7 is a diagrammatic side view of an exemplary double layer wave power generation unit 240, in accordance with an embodiment of the present invention. In the present embodiment, two wave power generation floats 300 are slidably disposed along a first float guide 242 and a second float guide 243 that connect an upper frame 241 and a lower frame 244. In order to increase the total amount of electricity that may be generated by wave power generation unit 240 without using additional float guides, a first module fixing body 248 and a second module fixing body 249 are disposed on the top of first float guide 242 and second float guide 243, respectively. A plurality of wave power conversion modules 400 are disposed in said module fixing bodies 248 and 249. Preferably, module fixing bodies 248 and 249 comprise the same construction as wave power generation floats 300 without buoyancy increasing means 330 and the float tube into which float guides 242 and 243 are inserted.

Power transmitting cables 401a extended from wave power conversion modules 400 in module fixing bodies 248 and 249 are fastened to cable fastening collars to fix power transmitting cables 401a to the upper portion of wave power generation floats 300. The cable fastening collars are similar to cable fastening collars 315, shown by way of example in FIG. 3, formed in said the upper portion of wave power generation floats 300. In the present embodiment, cable tension in power transmitting cables 401a is maintained by an elastic force providing means such as, but not limited to, a spiral spring in wave power conversion module 400. A plurality of power transmitting cables 401 extended from wave power generation floats 300 are fastened to a cable fixing means 246 and 247 mounted on lower frame 244 to fix end portions of power transmitting cables 401 to the upper side of lower frame 244.

In typical operation of the present embodiment, electricity is dually generated from wave power conversion modules 400 in both floats 300 and module fixing bodies 248 and 249. When the height of a wave is decreased, wave power generation floats 300 are moved down along float guides 242 and 243, and the distance between said floats 300 and lower frame 244 is decreased. Simultaneously, the distance between module fixing bodies 248 and 249 and floats 300 is increased. When the height of a wave is increased, wave power generation floats 300 are moved up along float guides 242 and 243, and the distance between floats 300 and lower frame 244 is increased. Simultaneously, the distance between module fixing bodies 248 and 249 and floats 300 is decreased.

Since the double layer design of present embodiment enables twice the amount of wave power conversion modules to be used, an apparatus incorporating the double layer design that is half the size of an apparatus incorporating the single layer design may theoretically produced the same amount of energy. Therefore, installing and operating can be eased, and manufacturing cost can be decreased because the size of the wave power generation apparatus needed for satisfying the required power demand can be relatively reduced in accordance with present embodiment. Thus, wave power generation unit 240 may be economically more attractive than a single layer unit may. In addition, in the present embodiment, the double layer type of wave power generation unit is illustrated in the form of wave power generation unit 210, illustrated by way of example in FIG. 2. However, in alternate embodiments, the double layer design for a wave power generation unit may be used in other wave power generation unit designs for an example, without limitation, wave power generation units 220 and 230, shown by way of example in FIG. 5 and FIG. 6, respectively.

Figure 8:
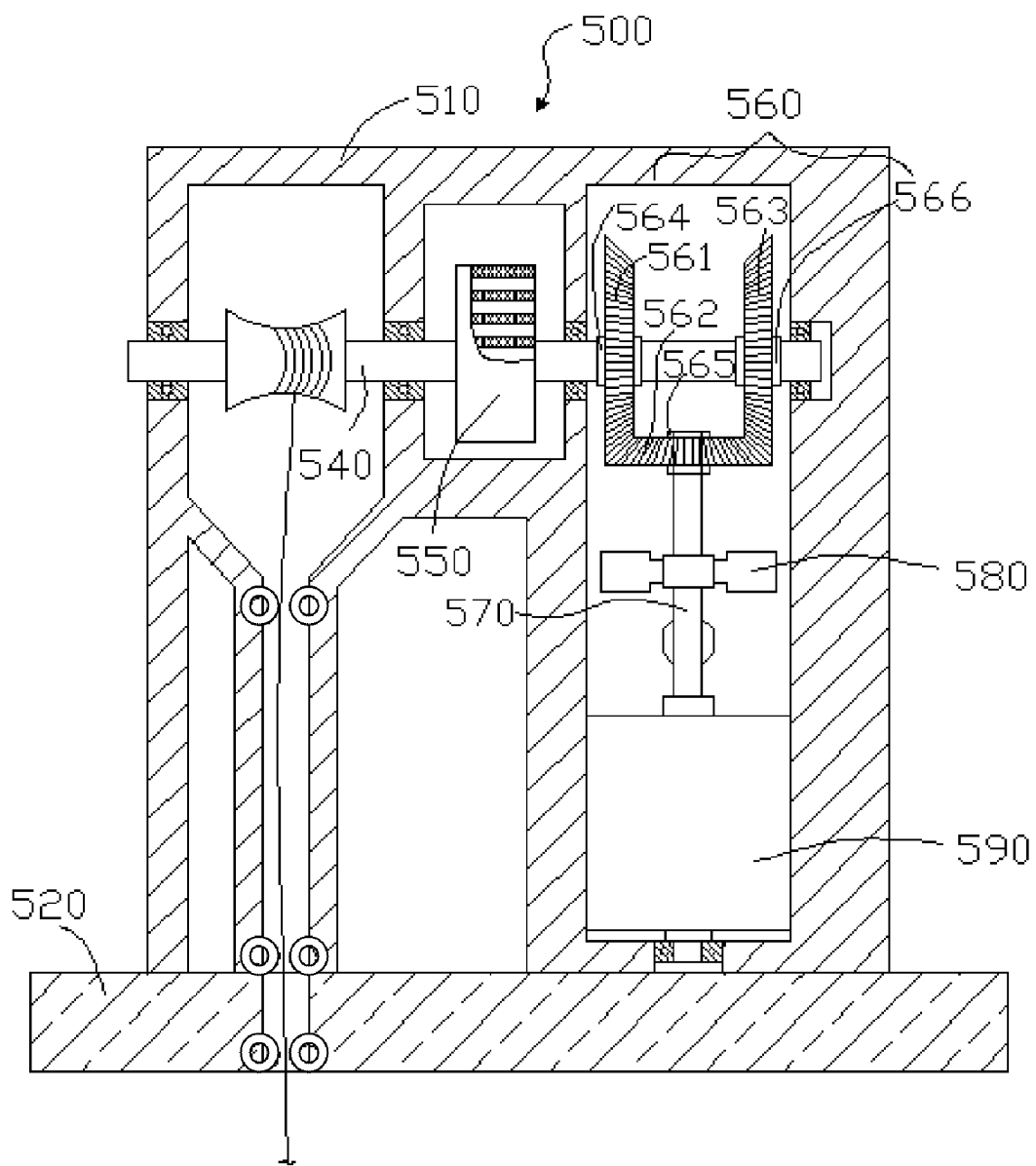
FIG. 8 is a cross sectional view of an exemplary wave power conversion module with a three-bearing design, in accordance with an embodiment of the present invention.

FIG. 8 is a cross sectional view of an exemplary wave power conversion module 500 with a three-bearing design, in accordance with an embodiment of the present invention. In the present embodiment, a power transmission drive 560 of wave power conversion module 500 comprises of a first input gear 561 and a second input gear 563 which are disposed on an input shaft 540 and an output gear 562 which is disposed on an output shaft 570. Input shaft 540 is perpendicular to output shaft 570. Output gear 562 is perpendicularly meshed with both input gears 561 and 563. A first side one way bearing 564 and a second side one way bearing 566 are interposed between input gears 561 and 563 and said input shaft 540 respectively. One way bearings 564 and 566 are oriented in different rotational directions from each other. This enables the rotational direction of output gear 562 to be only in one rotational direction. An output side one way bearing 565 is interposed between output gear 562 and output shaft 570. Said output side one-way bearing 565 is oriented in order to make output shaft 570 rotate in the rotational direction of output gear 562. The diameter of input gears 561 and 563 is greater than the diameter of output gear 562 for overdrive purposes. Preferably, input gears 561 and 563 and output gear 562 are bevel gears. However alternate gear configurations may be used for example, without limitation, a combination of two crown gears on the input shaft and a pinion gear on the output shaft.

In typical operation of the present embodiment, when input shaft 540 is rotated in either direction by wave energy, rotational force is transmitted from input shaft 540 to input gear 561 or 563 depending on the rotational direction. The force transmitted to output gear 562 rotates in only one direction, and output gear 562 is locked with output shaft 570 through output side one way bearing 565. In this way, the force is transmitted from input shaft 540 to output shaft 570 rotating in only one direction.

Therefore, though input shaft 540 may be rotated in both directions by the kinetic wave energy and elastic force providing means 550, output shaft 570 is rotated in only one direction by power transmission drive 560. Since output side one way bearing 565 is disposed on output shaft 570, the rotation of output shaft 570 is not limited by the number of rotations of input gears 561 and 563. Therefore a flywheel 580 for storing rotational energy can be used on output shaft 570 for increasing efficiency of wave power generation conversion module 500.

Generally, among parts inside wave power generation conversion module 500, a generator 590 requires frequent maintenance and repair due to malfunction of generator 590 caused by conditions such as, but not limited to, high humidity, seawater, high temperatures caused by continuous power generation, and abrasion of brush when a D.C. generator is used. Therefore output gear 562, output shaft 570 and generator 590 are formed as a generator assembly. Said generator assembly can be easily replaced with a new generator assembly by opening and separating a module case 510 from a module base 520. Thus, the required time for maintenance of generator 590 is reduced.

Figure 9:
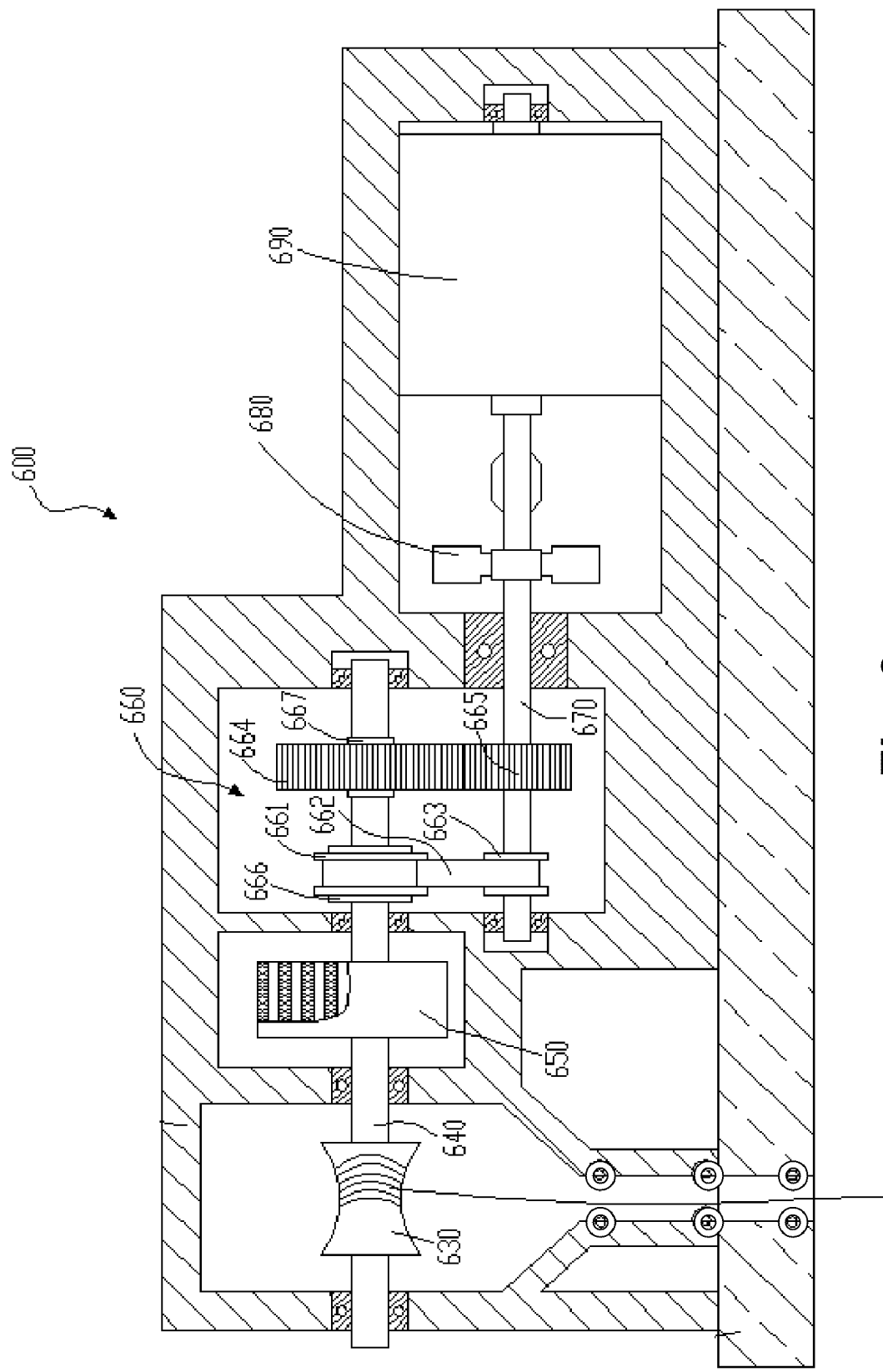
FIG. 9 is a cross sectional view of an exemplary wave power conversion module with a parallel transmission drive, in accordance with an embodiment of the present invention.

FIG. 9 is a cross sectional view of an exemplary wave power conversion module 600 with a parallel transmission drive, in accordance with an embodiment of the present invention. In the present embodiment, a power transmission drive 660 of wave power conversion module 600 comprises an input pulley 661 and an input gear 664 that are disposed on an input shaft 640 and an output pulley 663 and an output gear 665 that are fixed to an output shaft 670. The diameter of input pulley 661 and input gear 664 is greater than the diameter of output pulley 663 and output gear 665 for overdrive purposes. Input shaft 640 and output shaft 670 are disposed in parallel. Input pulley 661 and output pulley 663 are connected through a belt 662, and input gear 664 and output gear 665 are meshed with each other. An input pulley side one way bearing 666 and an input gear side one way bearing 667 are interposed between input pulley 661 and input shaft 640 and input gear 664 and input shaft 640, respectively. One way bearings 666 and 667 are oriented in different rotational directions to each other to transmit power.

In typical operation of the present embodiment, when input shaft 640 is rotated in either one of both rotational directions, input gear side one way bearing 667 is locked with input gear 664 and input pulley 661 idles. Thus the rotational force is transmitted from input gear 664 to output shaft 670 through output gear 665. Output shaft 670 rotates in the opposite rotational direction of input shaft 640 due to the characteristics of the gearing. When input shaft 640 is rotated in the reverse rotational direction, input pulley side one way bearing 666 is locked with input pulley 661 and input gear 664 idles. Thus rotational force is transmitted from input pulley 661 to output shaft 670 through output pulley 663 and belt 662. Output shaft 670 and input shaft 640 are rotated in the same rotational direction due to the characteristics of the belt and pulley system. Therefore, output shaft 670 can be continuously rotated in one direction regardless of the rotational direction of input shaft 640, and electricity can be smoothly generated in a generator 690 with a flywheel 680 disposed on output shaft 670. In this manner, input shaft 640 is rotated varying its rotational direction by the kinetic wave energy and an elastic force providing means 650 which is preferably a spiral spring, and output shaft 670 is rotated in only one rotation direction by power transmission drive 660.

The wave power conversion modules shown by way of example in FIGS. 4, 8 and 9 illustrate exemplary drive transmissions and gear configurations. Those skilled in the art, in light of the present teachings, will readily recognize that a multiplicity of alternate transmissions and gear configurations may be used in alternate embodiments.

Figure 10:
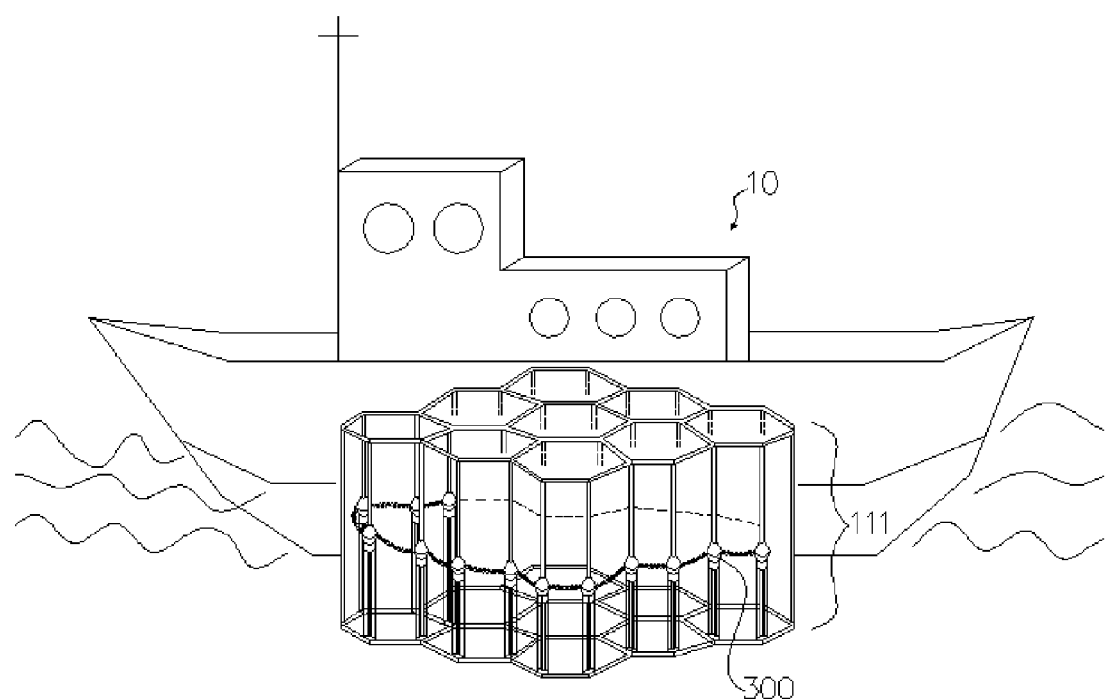
FIG. 10 is a side perspective view of an exemplary wave power generation structure that is connected to a vessel, in accordance with an embodiment of the present invention.

FIG. 10 is a side perspective view of an exemplary wave power generation structure 111 that is connected to a vessel 10, in accordance with an embodiment of the present invention. In the present embodiment, wave power generation structure 111 is connected to the side of vessel 10, and structure 111 is semi-submerged. As a method for connecting structure 111 to vessel 10, various different fastening means may be used such as, but not limited to, bolting, tying, clamping, welding etc. According to the present embodiment, wave power generation structure 111 can be relocated by navigating vessel 10 to a location with a good source of wave energy where the waves are more suitable to generating energy, continuous, and predictable with a large wave height difference for electricity generation.

Since a vessel has high tonnage, vessel 10 is relatively stable against fluctuation due to waves. However, small wave power generation floats 300 can respond quickly to fluctuations of waves and generate electrical energy. In the case of modifying a conventional vessel or a ship into a wave power generation apparatus by connecting wave power generation structure 111, extra structures used in stand alone wave power generation apparatuses such as, but not limited to, a buoyant tank, shake reducing means and a mooring cable can be omitted because the characteristics of vessel 10 make these structures unnecessary. Therefore the manufacturing cost for a wave power generation apparatus attached to a vessel can be decreased in comparison to a stand alone apparatus. This method of deployment also enables wave power generation structure 111 to be moved to avoid extreme weather such as, but not limited to, hurricanes or typhoons by navigating it to safe zone such as, but not limited to, a harbor or the like.

Figure 11:
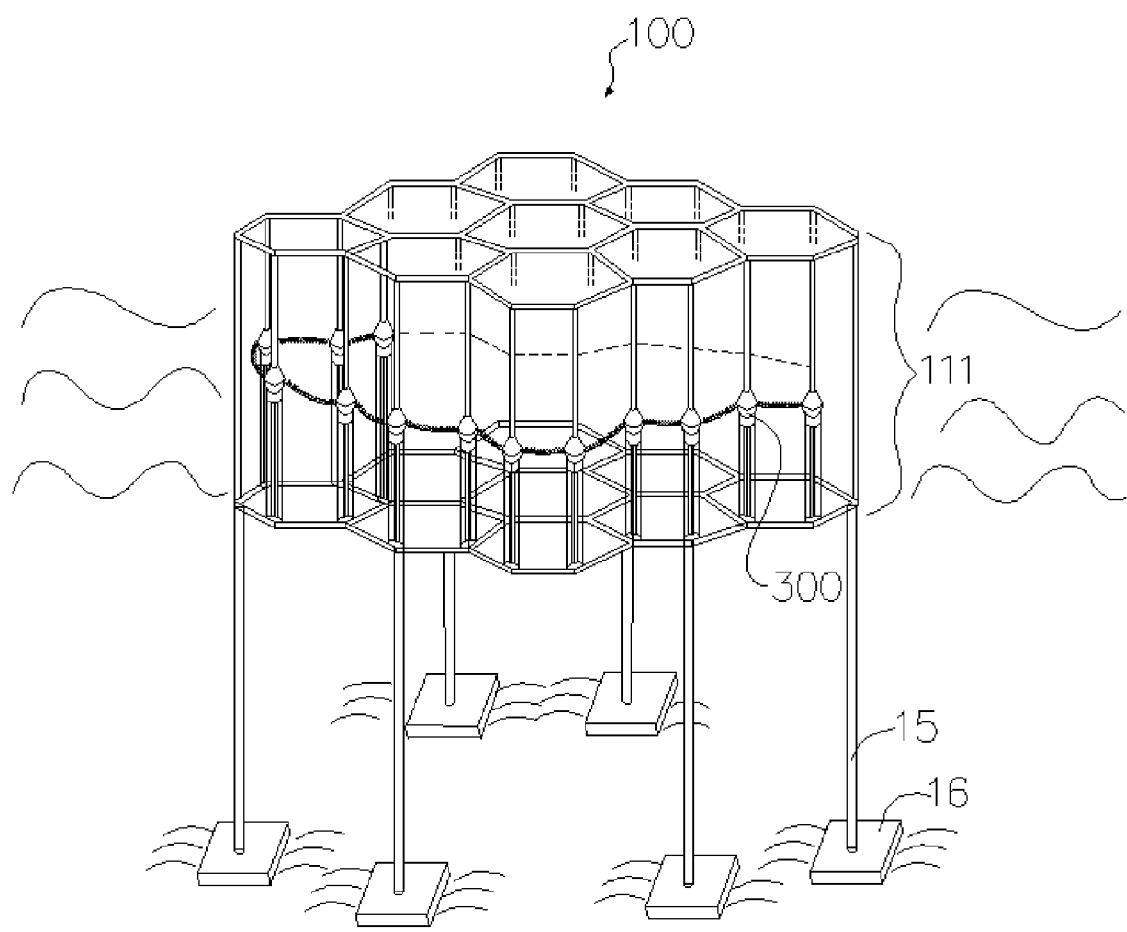
FIG. 11 is a side perspective view of an exemplary wave power generation apparatus that is fixed to the seabed, in accordance with an embodiment of the present invention.

FIG. 11 is a side perspective view of an exemplary wave power generation apparatus 100 that is fixed to the seabed, in accordance with an embodiment of the present invention. In the present embodiment, wave power generation apparatus 100 is fixed to the seabed by fixing poles 15 and fixing concrete 16 so that wave power generation structure 111 is semi-submerged. Wave power generation structure 111 can be directly fixed on seabed without a buoyant tank, mooring cable, shake reducing means, or the like. Such direct fixing of wave power generation apparatus 100 can be applied to relatively shallow sea, lakes, ocean shores, etc. In an alternate method for deploying wave power generation structure 111, a conventional oilrig (not shown) can be used as a fixing platform for wave power generation structure 111.

Having fully described at least one embodiment of the present invention, other equivalent or alternative methods of providing a wave power generation apparatus according to the present invention will be apparent to those skilled in the art. The invention has been described above by way of illustration, and the specific embodiments disclosed are not intended to limit the invention to the particular forms disclosed. For example, the particular implementation of the wave power generation units may vary depending upon the particular type of float guides used. The wave power generation units described in the foregoing were directed to rectangular implementations; however, similar techniques are to provide wave power generation units in various different shapes including, but not limited to, squares, triangles, units with no upper frame or no lower frame, etc. Non-rectangular implementations of the present invention are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. An apparatus for converting wave energy into electrical energy, the apparatus comprising:
    a wave power conversion module comprising:
        a module case;
        an air sealing tube formed in said module case for generally preventing fluids from entering said module case by compression of air in said module case, said air sealing tube extending downward from an interior of said module case through a bottom of said module case;
        a power transmission cable for transmitting electrical energy where one end of said power transmission cable passes through said air sealing tube;
        a cable reel rotatably supported within said module case for winding and unwinding a portion of said power transmission cable in response to vertical motion;
        an elastic force means joined to said cable reel for storing elastic force during said cable reel rotating to unwind said portion of said power transmission cable and for releasing said stored elastic force to enable said cable reel to wind said portion of said power transmission cable;
        an input shaft joined to said cable reel and said elastic force means;
        a power transmission drive joined to said input shaft for translating a bidirectional rotation of said input shaft into a unidirectional rotation;
        an output shaft joined to said power transmission drive for transferring said unidirectional rotation; and
        a generator joined to said output shaft for generating electrical energy in response to said unidirectional rotation of said output shaft, and for transferring the electrical energy to said power transmission cable.

2. An apparatus for converting wave energy into electrical energy, the apparatus comprising:
    at least one wave power generation unit comprising:
        an upper frame;
        a lower frame;
        means for joining said upper frame and said lower frame; and
        means joined to said joining means for vertical motion in response to the wave energy, said vertical motion means comprising:
        an upper float covering;
        a lower float covering sealed to said upper float covering;
        means for guiding a cable from an interior of said vertical motion means downward through said lower float; and
        means for power conversion contained within said vertical motion means, said power conversion means comprising:
        a module case;
        means for generally preventing fluids from entering said module case by compression of air in said module case, said preventing means extending downward from an interior of said module case through a bottom of said module case;
        means for transmitting electrical energy through said preventing means and said guiding means;
        means for winding and unwinding a portion of said transmitting means in response to said vertical motion;
        means for storing elastic force during said means for winding and unwinding rotating to unwind for releasing said stored elastic force to enable said means for winding and unwinding rotating to wind;
        an input shaft joined to said means for winding and unwinding and said storing means;
        means for translating a bidirectional rotation of said input shaft into a unidirectional rotation;
        means for transferring said unidirectional rotation; and
        means for generating electrical energy in response to said unidirectional rotation, and for transferring the electrical energy to said transmitting means.

3. An apparatus for converting wave energy into electrical energy, the apparatus comprising:
    at least one wave power generation unit comprising:
        an upper frame;
        a lower frame;
        a plurality of float guides for joining said upper frame and said lower frame; and
        at least one wave power generation float joined to said float guides for vertical motion in response to the wave energy, said wave power generation float comprising:
        an upper float covering;
        a lower float covering sealed to said upper float covering;
        at least one cable guiding tube extending from an interior of said wave power float downward through said lower float; and
        at least one wave power conversion module contained within said wave power generation float, said wave power conversion module comprising:
        a module case;
        an air sealing tube formed in said module case for generally preventing fluids from entering said module case by compression of air in said module case, said air sealing tube extending downward from an interior of said module case through a bottom of said module case;
        a power transmission cable for transmitting electrical energy where one end of said power transmission cable passes through said air sealing tube and said cable guiding tube, and is joined to said lower frame;

a cable reel rotatably supported within said module case for winding and unwinding a portion of said power transmission cable in response to said vertical motion of said wave power generation float;

an elastic force means joined to said cable reel for storing elastic force during said cable reel rotating to unwind said portion of said power transmission cable and for releasing said stored elastic force to enable said cable reel to wind said portion of said power transmission cable;

an input shaft joined to said cable reel and said elastic force means;

a power transmission drive joined to said input shaft for translating a bidirectional rotation of said input shaft into a unidirectional rotation;

an output shaft joined to said power transmission drive for transferring said unidirectional rotation; and a generator joined to said output shaft for generating electrical energy in response to said unidirectional rotation of said output shaft, and for transferring the electrical energy to said power transmission cable.

4. The apparatus as recited in claim 3, wherein said a top portion of said air sealing tube comprises a funnel shape for draining fluid from said interior.

5. The apparatus as recited in claim 3, wherein said power transmission drive further comprises:
a first input gear and a second input gear joined to said input shaft;
a first side one way bearing and a second side one way bearing oriented to be locked in opposite rotation directions and interposed between said first input gear, said second input gear and said input shaft;
an output gear joined to said output shaft and engaged with said first input gear and said second input gear, said output gear having a smaller diameter than that of said first input gear and said second input gear for increasing rotational speed; and
an output side one way bearing interposed between said output gear and said output shaft, and oriented to be locked with said output shaft for said output shaft to be rotated in a same direction as said output gear rotates.

6. The apparatus as recited in claim 5, wherein said output gear, said output shaft and said generator form a generator assembly for enabling ease of removal.

7. The apparatus as recited in claim 3, wherein said power transmission drive further comprises:
an input gear joined to said input shaft;
a first output gear and a second output gear joined to said output shaft, and engaged with said input gear, said first output gear and said second output gear having a smaller diameter than that of said input gear for increasing rotational speed; and
a first one way bearing and a second one way bearing oriented to be locked in a same rotation direction interposed between said first output gear, said second output gear and said output shaft.

8. The apparatus as recited in claim 3, wherein said input shaft and said output shaft are orientated substantially parallel and said power transmission drive further comprises:
an input pulley and an input gear joined to said input shaft;
a pulley one way bearing interposed between said input pulley and said input shaft;
a gear one way bearing interposed between said input gear and said input shaft, where said pulley and said gear one way bearing are reversely oriented to each other;
a belt;

an output pulley joined to said output shaft and engaged with said input pulley through said belt; and
an output gear joined to said output shaft and engaged with said input gear, wherein diameters of said input pulley and said input gear are relatively greater than that of said output pulley and said output gear for increasing rotational speed.

9. The apparatus as recited in claim 3, further comprising a flywheel joined to said output shaft for storing inertial energy.

10. The apparatus as recited in claim 3, wherein said upper float covering comprises a conical shape for enabling a wind to produce a downward force.

11. The apparatus as recited in claim 10, wherein said lower float covering comprises a conical shape for converting horizontal motion of wave energy into vertical motion.

12. The apparatus as recited in claim 3, wherein said wave power generation float further comprises buoyancy increasing means for adjustably increasing a buoyancy and a float tube for joining to a float guide.

13. The apparatus as recited in claim 3, further comprising a plurality of wave power generation floats joined to float guides and a plurality of elastic connecting bodies joining said plurality of wave power generation floats for restricting rotation of said plurality of wave power generation floats.

14. The apparatus as recited in claim 3, further comprising:
a first guiding member slidably joined to a first float guide;
a second guiding member slidably joined to a second float guide;
a first elastic connecting body joined to said first guiding member and said wave power generation float; and
a second elastic connecting body joined to said second guiding member and said wave power generation float, wherein said wave power generation float is joined to said first float guide and said second float guide for vertical motion in response to the wave energy.

15. The apparatus as recited in claim 3, further comprising:
a first wave power generation float slidably joined to a first float guide;
a second wave power generation float slidably joined to a second float guide;
a third wave power generation float;
a first elastic connecting body joined to said first wave power generation float and said third wave power generation float; and
a second elastic connecting body joined to said second wave power generation float and said third wave power generation float, wherein said first wave power generation float, second wave power generation float and third wave power generation float are joined to said first float guide and said second float guide for vertical motion in response to the wave energy.

16. The apparatus as recited in claim 3, further comprising:
at least one module fixing body joined to said upper frame and comprising at least one wave power conversion module where said power transmission cable of said at least one wave power conversion module is joined to said wave power generation float, wherein vertical motion of said wave power generation float in response to the wave energy enables said at least one wave power conversion module of said module fixing body to generate electrical energy.

17. The apparatus as recited in claim 3, further comprising:
a shake reducing means joined to bottom of the apparatus for lowering a center of gravity of the apparatus;
a buoyant tank joined to the apparatus for increasing buoyancy of the apparatus; and a mooring cable joined to said buoyant tank for mooring the apparatus.

18. The apparatus as recited in claim 3, wherein the apparatus is configurable for joining with a vessel.

19. The apparatus as recited in claim 3, wherein the apparatus is configurable for joining with a seabed.

20. The apparatus as recited in claim 3, wherein the apparatus further comprises a plurality of wave power generation units configured in a honeycomb arrangement.

* * * * *